United States Patent [19]
Schmidt et al.

[11] Patent Number: 5,952,066
[45] Date of Patent: Sep. 14, 1999

[54] TRANSPARENT PACKAGE WITH ALIPHATIC POLYKETONE OXYGEN SCAVENGER

[75] Inventors: Steven L. Schmidt, Bedford; Wayne N. Collette, Merrimack, both of N.H.; Ernest A. Coleman, Stamford, Conn.; Suppayan M. Krishnakumar, Nashua, N.H.

[73] Assignee: Continental PET Technologies, Inc., Florence, Ky.

[21] Appl. No.: 08/958,849

[22] Filed: Oct. 28, 1997

Related U.S. Application Data

[63] Continuation of application No. 08/510,360, Aug. 2, 1995, abandoned, which is a continuation-in-part of application No. 08/355,703, Dec. 14, 1994, Pat. No. 5,759,653.

[51] Int. Cl.⁶ ........................................................ B65B 55/19
[52] U.S. Cl. ...................... 428/35.9; 428/35.8; 428/36.7; 428/542.8; 428/483; 428/903.3; 252/188.24
[58] Field of Search .................. 428/35.9, 35.8, 428/36.7, 542.8, 483, 903.3; 252/188.24, 188.28; 215/12.1

[56] References Cited

U.S. PATENT DOCUMENTS

| 4,401,805 | 8/1983 | Weemes et al. | 528/302 |
| 4,895,689 | 1/1990 | Gerlowski | 264/216 |

(List continued on next page.)

FOREIGN PATENT DOCUMENTS

| 10080/88 | 7/1988 | Australia. |
| 0 369 713A2 | 5/1990 | European Pat. Off.. |

(List continued on next page.)

OTHER PUBLICATIONS

Chemical Abstracts, vol. 118, No. 4, Jan. 25, 1993, Columbus, Ohio, Abstract No. 23225, XP002051090 (Mitsui Petrochemical Ind.), Jun. 16, 1992.

Chemical Abstracts, vol. 107, No. 10, Sep. 7, 1987, Columbus, Ohio, Abstract No. 78465, XP002051091 (Mitsui Petrochemical Ind.), Jan. 23, 1987.

Eareckson, "Journal of Polymer Science," vol. 40, 1959, pp. 399–406, XP002051089.

(List continued on next page.)

*Primary Examiner*—Charles Nold
*Attorney, Agent, or Firm*—Wolf, Greenfield & Sacks, P.C.

[57] ABSTRACT

A substantially transparent package or preform made of a polymer composition including an aliphatic polyketone as an oxygen scavenger having the formula

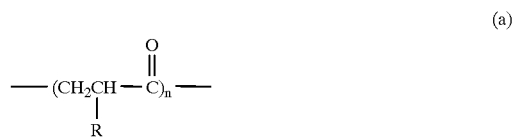

$$-(CH_2CH-C)_n- \quad (a)$$
with R side chain and C=O where n is the number of repeating units and R is hydrogen, an organic side chain, or a silicon side chain. The aliphatic polyketone may be advantageously combined with other thermoplastic polymers to provide the desired injection molding and stretch blow molding characteristics for making substantially amorphous injection molded preforms and substantially transparent biaxially oriented polyester containers. A multilayer container package may be provided having a core layer of the oxygen scavenging composition, and inner and outer layers of polyethylene terephthalate (PET). The container may further include layers of a high-oxygen barrier polymer such as ethylene vinyl alcohol (EVOH). When filled with a liquid product including water, the water vapor from the product may permeate the inner and core layers to facilitate removal and consumption of entrapped oxygen by the core scavenging layer. The aliphatic polyketone provides a highly reactive oxygen scavenger which is made from low-cost monomers and which remains colorless during processing.

26 Claims, 5 Drawing Sheets

U.S. PATENT DOCUMENTS

| | | | |
|---|---|---|---|
| 4,962,164 | 10/1990 | Jabarin et al. | 525/445 |
| 4,996,086 | 2/1991 | Gerlowski et al. | 427/421 |
| 5,021,515 | 6/1991 | Cochran et al. | 525/371 |
| 5,034,252 | 7/1991 | Nilsson et al. | 428/35.8 |
| 5,049,624 | 9/1991 | Adams et al. | 525/371 |
| 5,077,111 | 12/1991 | Collette | 428/36.7 |
| 5,153,038 | 10/1992 | Koyama et al. | 428/35.8 |
| 5,175,245 | 12/1992 | Klingensmith et al. | 528/392 |
| 5,202,052 | 4/1993 | Zenner et al. | 252/188.2 |
| 5,239,016 | 8/1993 | Cochran et al. | 525/371 |
| 5,281,360 | 1/1994 | Hong et al. | 252/188.2 |
| 5,301,838 | 4/1994 | Schmidt et al. | 222/95 |
| 5,314,987 | 5/1994 | Kim et al. | 528/289 |
| 5,346,644 | 9/1994 | Speer et al. | 252/188.28 |
| 5,506,014 | 4/1996 | Minnick | 428/35.7 |

FOREIGN PATENT DOCUMENTS

| | | |
|---|---|---|
| 0394751 A2 | 10/1990 | European Pat. Off. . |
| 0 519 616A1 | 12/1992 | European Pat. Off. . |
| A2149932 | 3/1973 | France . |
| 90/00504 | 1/1990 | WIPO . |
| WO 96/18685 | 6/1996 | WIPO . |
| WO 96/18686 | 6/1996 | WIPO . |

OTHER PUBLICATIONS

Wallsgrove et al., "Polymeric Esters, Courtaulds Ltd.," Brit. 636429, Apr. 26, 1950.

Sandler et al., "Polymer Syntheses," Organic Chemistry, vol. 1, Second Edition, Academic Press, Inc.

Industrial Organic Chemistry, "Applications of Terephthalic Acid and Dimethyl Terephthalate," pp. 349–351.

Odian, "Principles of Polymerization", Third Edition, The College of Staten Island, New York, pp. 569–573.

Naser, Novel Advanced Systems For Engineering and Research, Inc., Polymer–CAD™ Version 1.6, Copyright 1994–1996.

"Oxbar: The Oxygen Barrier".

"CMB Pioneers New PET Oxygen Barrier," Plastics & Rubber Weekly, Feb. 10, 1990.

"CMB Develops Barrier PET Material," European Chemical News, Feb. 19, 1990.

Koyama et al., "Oxygen Scavenging Technology For Packaging (Oxyguard)," Popular Plastics & Packaging, Annual 1992.

Brocksmidt, "Coextrusion Developments Focus On Barrier Resins," Plastics Technology, Dec. 1987.

Lambert et al., "The Rate Of Absorption Of Oxygen By Ageless™: The Utility Of An Oxygen Scavenger In Sealed Cases," Studies In Conversation 37, 1992, 267–274.

"Design Guidelines For Plastic Bottle Recycling," Association Of Postconsumer Plastic Recyclers.

R.L. Danforth et al., "Development Of A Polymer Family Of Thermoplastic Aliphatic Polyketones," ANTEC '95, 2316–2318.

C.E. Ash et al., "Synthesis and Stability Of Aliphatic Polyketones," ANTEC '95, 2319–2325.

J.E. Flood et al., "Aliphatic Polyketone Thermal Properties and Polymer Morphology," ANTEC '95, 2326–2332.

D.H. Weinkauf et al., "The Chemical Resistance and Barrier Properties Of Aliphatic Polyketones," ABTEC '95, 2340–2344.

TRANSPARENT PACKAGE WITH ALIPHATIC POLYKETONE OXYGEN SCAVENGER

RELATED APPLICATIONS

This application is a continuation of application Ser. No. 08/510,360, filed Aug. 2, 1995 abandoned which is a continuation-in-part of and commonly owned U.S. Ser. No. 08/355,703 filed Dec. 14, 1994, U.S. Pat. No. 5,759,653.

FIELD OF THE INVENTION

The present invention relates to transparent packaging structures, e.g., blow-molded polyethylene terephthalate (PET) containers, which incorporate an aliphatic polyketone oxygen-scavenging composition for the packaging of oxygen-sensitive products.

BACKGROUND OF THE INVENTION

"Oxygen sensitive" materials, including foods, beverages, and pharmaceutical products, have special packaging requirements to prevent the ingress of exterior oxygen into the package and/or to scavenge oxygen which is present inside the package. In some cases, particularly in the orange juice and brewing industries, oxygen is removed from the product by vacuum or by inert gas sparging, or both. However, it is difficult and expensive to remove the last traces of oxygen by these methods; they have an additional disadvantage of tending to remove volatile product components which are often responsible for some or all of the aroma and flavor of the product.

Molecular oxygen ($O_2$) can be reduced to a variety of highly reactive intermediate species by the addition of one to four electrons. The carbon—carbon double bonds found in virtually all foods and beverages are particularly susceptible to reaction with these intermediate species. The resulting oxidation products adversely affect the performance, odor or flavor of the product. An "oxygen scavenger" is any material or compound which can remove oxygen from the interior of a closed package either by reacting or combining with the entrapped oxygen, or by promoting an oxidation reaction which yields innocuous products.

Extensive work has been done on incorporating metal-catalyzed oxidizable organic polymers (i.e., polyamides) as oxygen scavengers for the production of plastic containers. However, problems exist with the time/expense required to activate the scavenging composition, the toxicity of the metal-catalysts and the need to prevent interaction of the oxidative reaction byproducts with the package contents and/or environment, and the loss of the oxygen scavenging effect during storage prior to filling.

Other efforts to control oxygen permeation involve the use of high barrier layers which do not scavenge oxygen, but merely retard the transmission of oxygen through the container wall. Of significant commercial success are the five-layer ketchup and hot-fill juice containers developed by Continental PET Technologies, Inc. of Bedford, N.H. These multilayer structures incorporate inner, core and outer layers of PET, and intermediate layers of a high oxygen barrier material such as ethylene vinyl alcohol (EVOH).

There has recently been announced the development of a new family of thermoplastic aliphatic polyketones having improved oxygen barrier properties. See: "Development of a New Polymer Family of Thermoplastic Aliphatic Polyketones," R. L. Danforth and J. M. Machado; "The Chemical Resistance and Barrier Properties of Aliphatic Polyketones," D. H. Weinkauf, P. A. Kinneberg, and C. E. Ash; "Synthesis and Stability of Aliphatic Polyketones," C. E. Ash, D. G. Waters, and A. A. Smaarkdijk; and other papers presented by Shell Development Company, Houston, Tex., at the Society of Plastics Engineers (SPE) 1995 ANTEC Conference, Session W30 (Thermoplastic Materials and Foams). Early polyketones quickly embrittled upon heat aging; however, the recent use of antioxidant additives is said to produce polyketone polymers resistant to thermal oxidative degradation (Ash et al. at page 2320). Also, these new polymers are said to have a low oxygen permeability at room temperature and under dry conditions, resulting from relatively low polymer-penetrant interactions and strong interchain forces that reduce the rate of diffusion (Weinkauf at page 2342). However, as the relative humidity (moisture content) increases, the barrier property is diminished. Therefore, the authors describe their efforts to reduce the negative effect of water on the oxygen barrier property, whereby the polymer is expected to be useful for food packaging applications (Weinkauf at page 2342). Weinkauf et al. also seek to reduce or eliminate aldol condensation which renders the polymer brittle and reduces processability (Weinkauf at page 2342).

The apparent goal of Weinkauf et al. is to: (1) eliminate oxygen degradation through the use of anti-oxidant additives; and (2) reduce oxygen penetration and/or diffusion at higher levels of moisture content, presumably via polymer structure, additives and/or process conditions. Again, this approach seeks to maximize the barrier property, and minimize oxygen reactivity. In a proposed packaging application, it is believed that this polyketone polymer would be highly crystallized in order to enhance the strength (note the polymer's low $T_g$ of 15° C.), which would render the package opaque (nontransparent). Thus, there is no indication that a transparent container can be obtained by this method and clearly, the oxygen reactivity is a property the authors consider undesirable and seek to eliminate.

The variety of oxygen barrier systems and oxygen scavenging systems disclosed in the art is strong evidence of the commercial need for such packaging, and also that the known systems do not satisfy all of the problems. Thus, there is an ongoing need for packaging for oxygen-sensitive products which is both cost-effective and provides a long product shelf life.

SUMMARY OF THE INVENTION

The present invention is directed to the novel use of an aliphatic polyketone as an oxygen scavenger in a structure for the packaging of oxygen-sensitive products. In contrast to the prior art which would modify the aliphatic polyketone to render it less reactive with and less permeable to oxygen, this invention utilizes the polymer's high oxygen reactivity to effectively capture any oxygen which may enter the product and thus enhance the shelf life. As an additional benefit, the carbon dioxide ($CO_2$) which builds up in the package sidewall (as a degradation product) would be expected to reduce the migration of $CO_2$ from the food product.

Aliphatic polyketone co- and terpolymers are semi-crystalline thermoplastics having a high melting point and good strength, toughness, and impact strength. Their mechanical properties include high levels of stiffness, toughness and strength over a broad temperature range, and resistance to hydrolysis, swelling, and chemical attack. A linear, high-molecular weight alternating copolymer of ethylene and carbon monoxide may be used, or a terpolymer produced from ethylene, carbon monoxide, and a minor amount of propylene. The aliphatic polyketone oxygen scavenger may be advantageously combined with other thermoplastic polymers to provide the desired injection molding and stretch blow molding characteristics. The aliphatic polyketone may be blended with PET, recycled PET, polyethylene naphthalate (PEN), or other polymers. Generally, the polyester or other structural polymer is the primary polymer comprising 90–99.9% by total weight of the polymer composition, preferably at least 95%, and more preferably at least about 98%.

The polyketone has a varying barrier property with moisture content which may be utilized in the present invention. In one embodiment, a multilayer expanded preform container body has a core layer which includes an aliphatic polyketone as an oxygen scavenger having the formula:

(a)

where n is the number of repeating units and R is selected from the group consisting of hydrogen, an organic side chain, and a silicon side chain. The container body is substantially transparent and includes exterior PET layers and inner and outer intermediate barrier layers of ethylene vinyl alcohol (EVOH). Upon filling with an aqueous product, water vapor permeates through the inner PET and EVOH layers causing an increase in moisture content which reduces the barrier property of the EVOH and polyketone and allows oxygen entrapped in the product during filling to permeate through the inner layers and be consumed by the core layer. The outer EVOH layer remains sufficiently dry to prevent oxygen transmission from the exterior of the container.

In another embodiment, a monolayer transparent package is provided wherein an aliphatic polyketone is blended or copolymerized with other polymers. For example, a blend comprising 0.1 to 10% by total weight of a polyketone terpolymer scavenger, and the remainder PET, is used to form an injection molded preform and transparent expanded preform beverage bottle. At relatively low levels, the polyketone polymer remains amorphous and the container substantially transparent (in contrast to the highly crystalline and opaque barrier polyketone proposed in the art). In this embodiment, the terpolymer may scavenge oxygen from the container based on direct food contact with the product.

These and other advantages of the present invention will be more particularly set forth with regard to the following detailed description and accompanying drawings.

DETAILED DESCRIPTION

Aliphatic polyketones, also referred to as poly(olefin-ketones), are linear, alternating copolymers having the generalized formula shown in formula a:

(a)

where n is the number of repeating units and R is hydrogen, an organic side chain, or a silicon based side chain. These polymers are produced from abundant and inexpensive monomers—ethylene (or other alpha-olefins) and carbon monoxide. The molecular structure, combining simple, linear repeating units with strong polar intermolecular forces and a flexible polymer backbone, produces semicrystalline materials with excellent thermal, mechanical, and barrier properties.

The simplest member of this class of polyketones is the alternating copolymer of ethylene and carbon monoxide (E/CO):

($a_1$)

This polymer structure is sensitive to oxidation (and aldol reaction) because the $CH_2$ protons are activated by the carbonyl (CO) groups. All protons are activated by carbonyl groups so the emperical formula $C_3H_4O$, with a molecular weight of only 56, will in theory react with 64 grams of oxygen to form $-(CO)_n-$, which in turn may react with more oxygen to generate carbon dioxide. Thus, 56 grams of an E/CO copolymer may ultimately react with 112 grams of oxygen. Optionally, catalysts may be used to further promote this reaction.

The above calculation indicates that one gram of the E/CO copolymer will consume two grams of oxygen. In contrast, one gram of an oxygen-sensitive polyamide structure, e.g.,:

where R is a difunctional alkyl group and $-C_6H_4-$ is usually para, and which compound is activated by catalysts such as cobalt and palladium, would consume only 0.294 grams of oxygen. This is about six times less than the E/CO copolymer would consume on a theoretical weight basis.

The aliphatic polyketone polymer chains are flexible, but possess enough molecular symmetry and cohesive energy derived from the polar ketone groups to produce a tough, high-melting, semicrystalline thermoplastic suitable for a broad range of applications. Particularly important is its high melting point and thermal stability making it suitable for use with PET, and the ability to produce a colorless (substantially transparent) container therefrom.

It is possible to introduce a second olefinic monomer into the polymerization, such as propylene, which will substitute randomly for ethylene, and in alternation with carbon monoxide, to produce the terpolymer poly(ethylene-alt-carbon monoxide)-stat-(propylene-alt-carbon monoxide) (hereinafter E/P/CO terpolymer):

(a₃)

where n and m are the number of repeating units respectively.

The termonomer modifies the melting point and crystallinity of the polymer in order to broaden the melt processing window and further improve the resilience and ductility of the polymer. By way of example, the E/P/CO terpolymer is a semicrystalline material having a melting point of 220° C., and a glass transition temperature in the neighborhood of 15° C. The specific gravity is 1.24 g/cm³ at room temperature, and about 1.00 g/cm³ in the melt. The stiffness at room temperature is moderate, with tensile and flexural moduli of about 1.7 GPa (250 kpsi), however the material exhibits good retention of stiffness up to temperatures reasonably close to the melting point. At room temperature, the E/P/CO terpolymer exhibits a natural draw ratio of around 300%. The tensile yield stress at room temperature is 62 MPa (9000 psi). The impact strength is unusually high for an unmodified semi-crystalline polymer, and increases with increasing molecular weight. The notched Izod impact strength is 220 J/m (4 ft-lb/in) at room temperature and 50 J/m (1 ft-lb/in) at −40° C. The E/P/CO terpolymer is commercially available from Shell Development Company, Houston, Tex.

E/P/CO is just one example of a terpolymer, there being many other possible terpolymers with varying properties. Alternatively, it is possible to introduce one or more other olefin monomers that will copolymerize, such as acrylates, methacrylates, alkyl compounds, vinyl acrylate, vinylsilanes, vinyl chloride, etc. Additives such as aldol blocking agents, lubricants, release agents, etc. may be used to enhance processing properties and to reduce the tendency for aldol condensation.

The polarity of the polyketone also results in a modest level of moisture absorption—0.5% at 50% relative humidity (RH) and 2.3% at saturation (100% RH). The absorbed water exhibits a mild plasticizing effect on stiffness and almost no effect on strength. The ketone group has little tendency to hydrolize. Thus, the polyketone exhibits resistance to hydrolysis and excellent stability under a broad range of aqueous environments (temperature, pH, salts, etc.).

The aliphatic polyketones are produced by polymerizing ethylene (or other alpha-olefins) with carbon monoxide over a palladium-based catalyst system. Notably, polymer synthesis occurs with perfect alternation of monomer units:

A bisphosphine Pd (II) based catalyst complex has been developed by Shell Laboratorium Amsterdam (KSLA)(see U.S. Pat. No. 4,835,250 (1989); European Patent Application 121965A2 (1984); and E. Drent et al., J. Organomet. Chem. 417 (1991) 235–251), and produces polyketones with essentially 100% selectivity at high catalytic activities (greater than 6000 g/g Pd/hr) and high yields under modest synthesis conditions. These catalysts provide stable, melt-processable polymers with catalyst residues measured in ppm, and provide the possibility of co- and terpolymerizing CO with other monomers such as propylene and styrene.

Another terpolymer that is even more active is made with styrene, ethylene and carbon monoxide:

(a₄)

The phenyl group (C₆H₅—) activates the tertiary proton (CH) far more than the methyl group.

The comonomers used may effect transparency and/or the processing conditions. In addition to a terpolymer with polypropylene, other olefins such as 1-butene, 1-pentene, 1-octene, etc. can be used to provide the necessary optical properties. Other alternatives are halogen-substituted olefins or silane-substituted olefins. For example, a silane-substituted olefin will produce the terpolymer:

(a₅)

which is expected to have different optical properties than the simple E/P/CO terpolymer.

Aldol condensation, i.e.:

-continued has been considered a problem with the production of aliphatic polyketones. However, in this invention it may be beneficial to include aldol condensation products because the aldol product, i.e.:

$$(C_3H_4O)_m(C_3H_2)_n$$

where m and n are the number of repeating units, is in theory more effective (in oxygen capture) than the parent polymer. The greater the degree of aldol reaction, the higher the oxygen efficiency. This factor, however, must be balanced against the color of the various aldol products, where the goal is to provide a substantially transparent package. For example, a polymer composition which is primarily PET, e.g., 90% by total weight of the composition, and 8% aliphatic polyketone, may include up to on the order of 2% aldol product by total weight of the composition.

If the aliphatic polyketone is to be a major structural element in the package, then it should have a high molecular weight (MW) in the commercial range of 1 or greater LVN (limiting viscosity number) or a melt flow index of 100 or less. If the polyketone is used with another polymer where both contribute to the strength, then an E/CO polymer with an LVN of less than 1 can be used, possibly as low as 0.5 or 0.6 dl/g. Finally, if the aldol reaction products of the co- or terpolymer are to be used, then LVN and melt flow index have less meaning as the crosslinking process progresses. In this case, polymers with boiling points above the expected processing temperature and all higher MW products are useful as additives.

Aliphatic polyketones are sensitive to UV radiation in direct sunlight exposure, whereby the polyketones undergo molecular weight loss due to chain scission. However, proper choice of UV additives can significantly improve the UV stability, e.g., Tinuvan P, sold by Ciba-Geigy; other UV stabilizers are sold by BASF, Bayer, Cytec, Hoechst-Celanese, Sandoz, Sumitomo, etc.

In general, the aliphatic polyketone structure is:

(a')

where n is equal to zero or any whole number and m is 1 or any whole number, and where X is selected from an organic side chain including hydrocarbon, alkyl, aryl, silyl, haloalkyl, haloaryl, substituted aryl, alkoxy,arloxy, etc.

The semicrystalline structure of the terpolymer is spherulitic, with spherulite size ranging from 5–15 microns. It appears to be an "entangled" spherulitic structure, which may contribute to its high-impact properties and toughness (by terminating crack propagation). The semicrystalline copolymer is an entangled hedritic structure, also with high-impact strength and good toughness.

The E/P/CO terpolymer generally exhibits between 20–40 weight percent crystallinity. A flexible backbone and high concentration of dipoles allows for efficient chain packing. The density of the terpolymer at room temperature is 1.235 g/cm$^3$ with an amorphous density of 1.206 g/cm$^3$.

At room temperature and in dry conditions, the oxygen permeability coefficients of aliphatic polyketones are among the lowest of conventional polymeric materials. However, as the moisture content is increased, the oxygen barrier of standard aliphatic polyketones is diminished. Table 1 shows the oxygen permeability coefficients of PET, nylon 66, ethylene vinyl alcohol (EVOH), and aliphatic polyketones, for comparison purposes:

TABLE 1

Oxygen permeability coefficients as a function of percent moisture content (%RH) at 23° C. for several barrier polymers. Oxygen permeability coefficient units: (cc(STP)mil/100in 2 day atm).

| Polymer | 0%rh | 75%rh | 90%rh |
|---|---|---|---|
| Poly(ethylene terephthalate (PET) | 3.4 | 3.5 | 3.5 |
| Poly(hexamethylene adipamide) (PA66) | 1.8 | 2.0 | 4.5 |
| Poly(ethylene-co-vinyl alcohol) (EVOH) | 0.09 | 0.11 | 0.35 |
| Aliphatic Polyketone | 0.1 | 1.0 | 3.4 |

(taken from D. Weinkauf et al., "The Chemical Resistance And Barrier Properties Of Aliphatic Polyketones," ANTEC '95, pages 2340–2344, Shell Development Company, Houston, Tex.). This increase in oxygen permeability at higher levels of relative humidity is useful in the container structures of the present invention for scavenging oxygen. When the container is filled with an aqueous product, water permeates the polyketone polymer and increases the relative humidity (moisture content), allowing any oxygen entrapped with the product during filling to migrate into the polymer where it is consumed by the aliphatic polyketone.

The following is a description of alternative structures in which the aliphatic polyketone may be used.

Multilayer Preform and Container Structures

Figure 1:
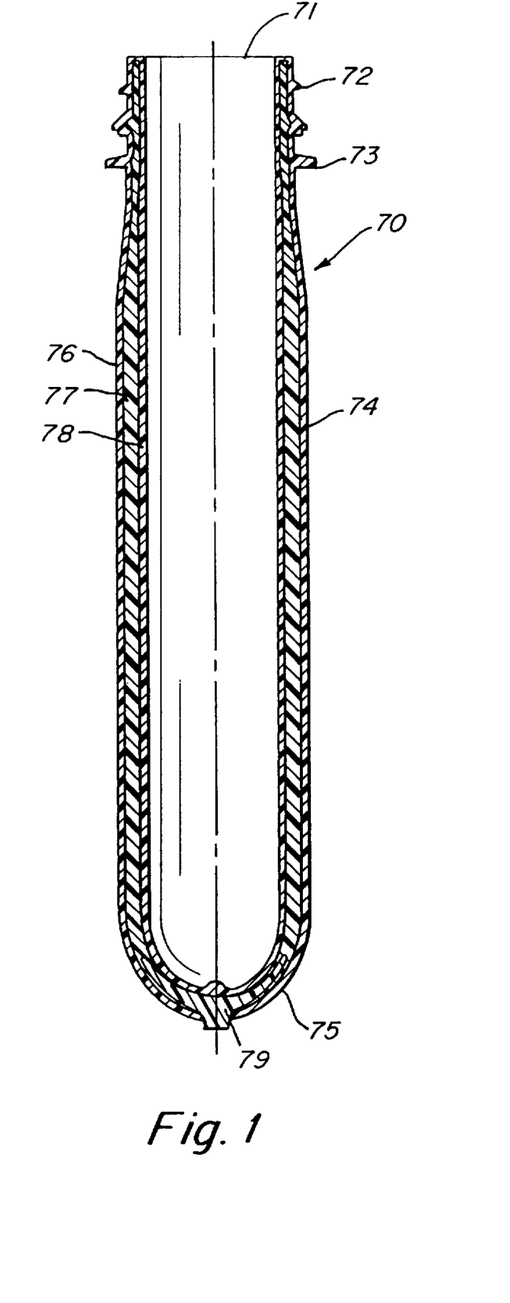
FIG. 1 is a cross-sectional view of a two-material/three-layer (2M, 3L) preform according to one embodiment of this invention.
Figure 2:
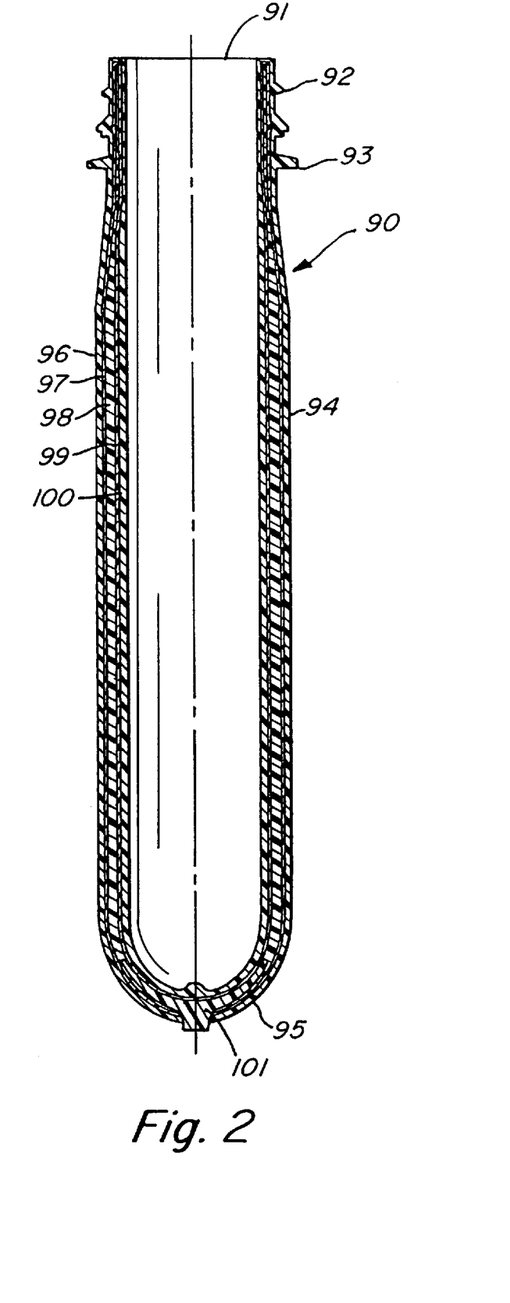
FIG. 2 is a cross-sectional view of a three-material/five-layer (3M, 5L) preform according to another embodiment of this invention.

FIGS. 1–2 show two alternative multi-layer preform structures, and FIGS. 3–6 show two alternative container structures, in accordance with the present invention.

FIG. 1 shows a substantially amorphous and transparent three-layer preform 70 having an open upper end 71, and a neck finish including outer threads 72 and a cylindrical flange 73. Below the flange is a substantially cylindrical body portion 74, terminating in a closed hemispherical bottom end 75.

The three-layer sidewall construction includes outer layer 76, core layer 77, and inner layer 78. By way of example, the inner and outer (exterior) layers may be virgin bottle grade PET, while the core layer is the aliphatic polyketone oxygen-scavenging composition of this invention. In a lower base-forming portion of the preform, a five-layer structure may be formed by a last shot of virgin PET (to clear the injection nozzle so it is filled with virgin PET for the next preform). In this case the virgin PET 79 extends to the exterior of the preform at the gate region. The dimensions and wall thicknesses of the preform shown in FIG. 1 are not critical to the invention. Any number of different preform constructions may be used.

The oxygen-scavenging core layer may include an oxidation catalyst (to further enhance the scavenging effect) and/or a UV protecting catalyst (to prevent UV degradation). Suitable oxidation-enhancing catalysts include cobalt, antimony, germanium, gold, and palladium. The polymerization catalyst residues may also catalyze oxidation. The polyketone may be blended with polymers such as PET, post-consumer (PC-PET) or PEN. The amount of aliphatic polyketone is sufficient to provide the oxygen scavenging effect and does not substantially reduce the transparency; the other polymers may enhance adhesion to outer and inner layers. Furthermore, where PC-PET is included in the core layer, the contaminants therein (in PC-PET) may enhance the oxygen-scavenging effect of the polyketone.

Figure 3:
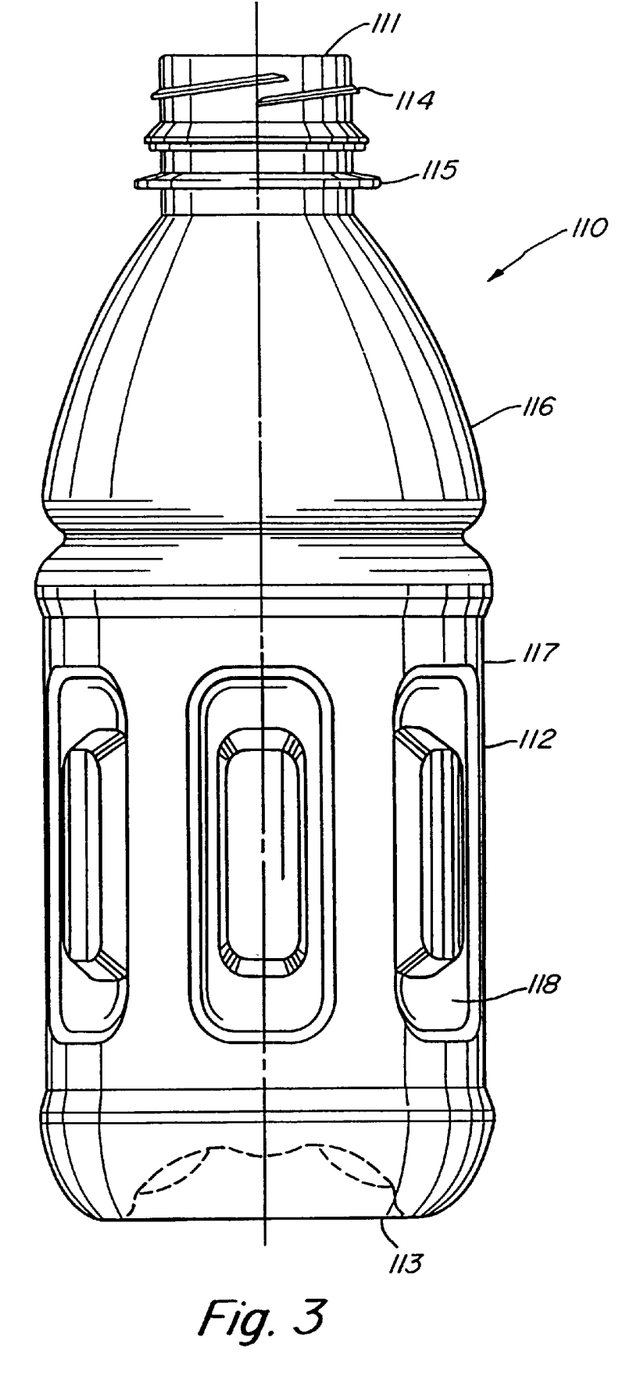
FIG. 3 is an elevational view of a hot-fill container made from the preform of FIG. 1.
Figure 4:
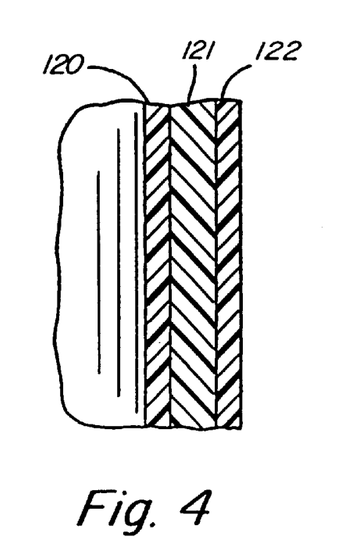
FIG. 4 is an enlarged fragmentary sectional view taken through the sidewall of the container of FIG. 3, showing the three layers.

FIGS. 3–4 show a representative hot-fill beverage container which may be stretch blow-molded from a three-layer preform, similar to that shown in FIG. 1. The hot-fill container 110 includes an open top end 111, substantially cylindrical sidewall 112, and closed bottom end 113. The container includes the same neck finish 114 and flange 115 as the preform, which are not expanded during blow molding. The sidewall includes a flared shoulder portion 116 increasing in diameter to a cylindrical panel portion 117, the latter including a plurality of vertically-elongated, symmetrically-disposed vacuum panels 118. The vacuum panels move inwardly to alleviate the vacuum formed during product cooling in the sealed container. Again, this container construction is by way of example only, and the invention is not limited to any particular package structure.

FIG. 4 shows the three-layer sidewall construction including inner layer 120, core layer 121, and outer layer 122. The inner and outer layers may be virgin bottle grade PET, while the core layer 121 is made of an aliphatic polyketone oxygen-scavenging composition.

FIG. 2 shows an alternative five-layer preform 90. Again, the preform includes an open upper end 91, neck finish with threads 92 and flange 93, and body-forming portion 94 with a closed bottom end 95. The five-layer sidewall construction includes outer layer 96, first intermediate layer 97, core layer 98, second intermediate layer 99, and inner layer 100, disposed in serial order. By way of example, the inner and outer layers 96 and 100 may be virgin bottle grade PET, while the intermediate layers 97 and 99 are a high oxygen barrier material such as EVOH, and the core layer 98 is the aliphatic polyketone oxygen-scavenging composition. Again in the base, there may be a last shot 101 of virgin PET to clear the nozzle of non-virgin polymer. The core layer scavenges oxygen from the interior of the filled package, and prevents exterior oxygen from reaching the contents of the package. The inner layer protects the food product from contact with the oxygen scavenger and its byproducts.

Figure 5:
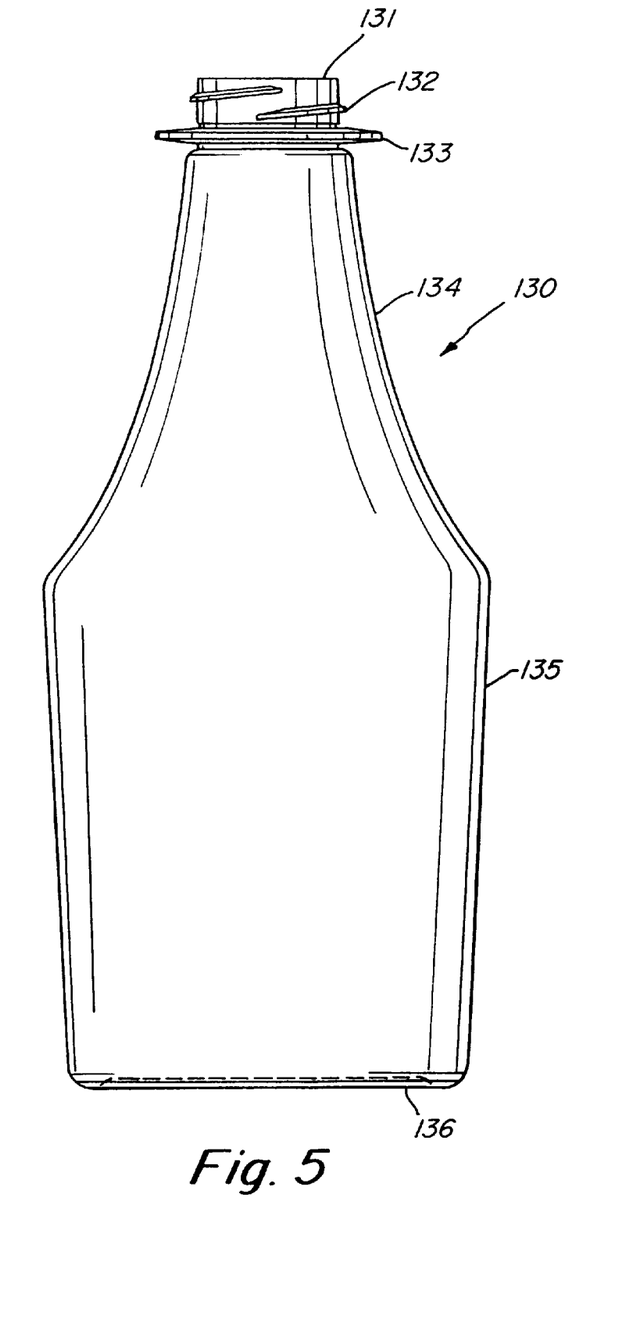
FIG. 5 is an elevational view of a ketchup container made from the preform of FIG. 2.
Figure 6:
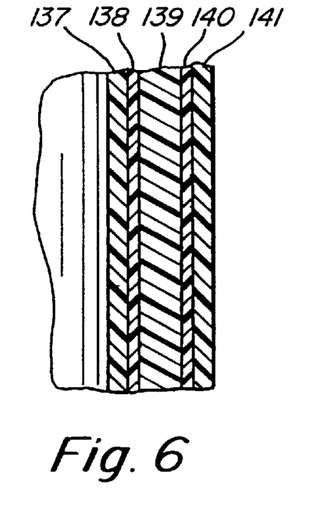
FIG. 6 is an enlarged fragmentary sectional view taken through the sidewall of the container of FIG. 5, showing the five layers.

FIGS. 5–6 show a representative ketchup container made from a five-layer preform similar to that of FIG. 2. Again, the details of the preform and container construction are not critical, and variations may be required to the preform construction in order to stretch blow mold the container of FIG. 5. The ketchup container 130 includes an open top end 131, neck finish 132 with flange 133, a shoulder portion 134 increasing in diameter, and a panel portion 135 connecting to a base 136. The five-layer sidewall construction, as shown in FIG. 6, includes an inner layer 137, first intermediate layer 138, core layer 139, second intermediate layer 140, and outer layer 141. The inner and outer layers 137 and 141 may be virgin bottle grade PET, the core layer an aliphatic polyketone oxygen scavenging composition, and the intermediate layers 138 and 140 a high oxygen barrier material such as EVOH.

Figure 7:
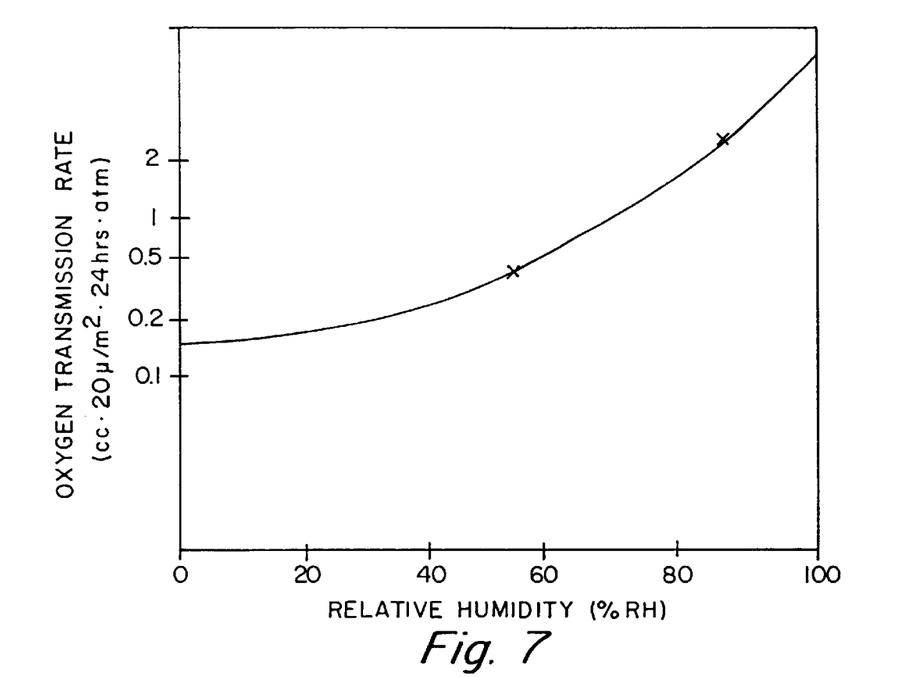
FIG. 7 is a graph illustrating an increase in oxygen transmission rate with increasing moisture content for EVOH.
Figure 8:
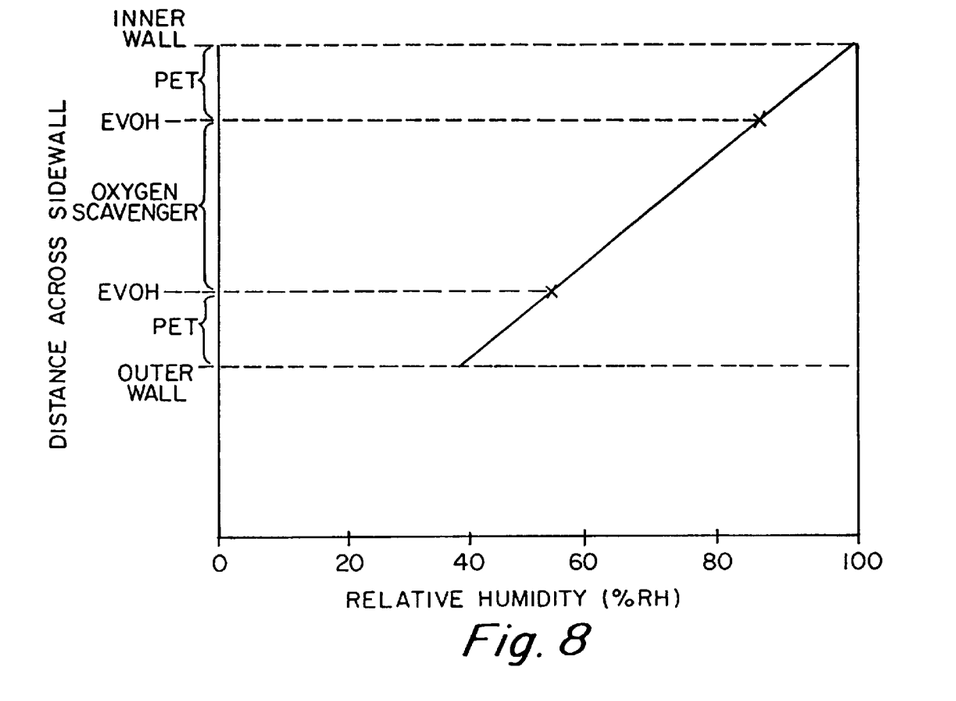
FIG. 8 is a graph illustrating the variation in moisture content across a container sidewall (after product filing) which increases the $O_2$ permeability of an inner EVOH layer, enabling transmission of oxygen through the inner layer to the oxygen-scavenging core layer.

FIGS. 7–8 illustrate the change in oxygen barrier condition when water from the product is transmitted across the wall. FIG. 7 shows the increase in oxygen transmission for EVOH with increasing moisture content (relative humidity). FIG. 8 shows the relative humidity across the respective layers of the five-layer container shown in FIG. 6. In an initial unfilled state, the five-layer container sidewall provides a high barrier to oxygen transmission based on the two very dry intermediate EVOH layers. When the container is filled with an aqueous product, water vapor permeates through the inner PET and EVOH layers causing a drop in the relative oxygen barrier property of the EVOH layer. As shown in FIG. 8, water vapor transmission across the wall may produce an 85% relative humidity at the inner EVOH layer, and a 55% moisture content at the outer EVOH layer. At 85% moisture content, the inner EVOH layer would have a relatively low oxygen barrier condition (see FIG. 7) and thus allow oxygen entrapped in the container with the product to be transmitted across the inner PET and inner intermediate EVOH layers to reach the central oxygen scavenging layer, where the oxygen would be consumed. In contrast, oxygen would be less able to pass the outer EVOH barrier layer, which is at a lower relative humidity.

Alternative Constructions

There are numerous multilayer preform and container constructions possible, each of which may be adapted for a particular food product and/or package, filling, and manufacturing process. A few representative examples will be given.

A first five-layer structure may have relatively thin inner and outer intermediate layers of EVOH to provide the necessary high oxygen barrier properties without loss of clarity. Relatively thicker inner and outer layers of virgin PET would provide the necessary strength and clarity. A thick oxygen scavenger layer, of for example 50% of the wall thickness, and incorporating an aliphatic polyketone and post consumer polyethylene terephthalate (PC-PET), provides the oxygen scavenging effect at a competitive price.

In an alternative five-layer structure, the two intermediate EVOH layers may be replaced by oxygen scavenging layers, and a non-scavenging core layer provided. For example, a PET/aliphatic polyketone blend comprising 2–10% of the total preform weight, and more preferably 4–6% of the total preform weight, would provide two highly concentrated intermediate oxidative layers to provide optimum scavenging while maintaining clarity by the low blend layer thickness. Adhesion to inner, outer and core layers of PET would also be improved. The center core layer may be virgin PET or post-consumer PET. Alternatively, the core layer may be an oxygen scavenging blend to further increase the shelf life, e.g., for highly $O_2$ sensitive products such as beer. The inner and outer layers would remain virgin PET for FDA approved use with food and beverages.

A first alternative three-layer sidewall construction may consist of an inner barrier layer providing a high oxygen barrier in one condition, and a lower oxygen barrier in a second condition, a central core layer of an oxygen scavenging material, and an outer layer to provide strength to the wall structure. The inner layer may be EVOH, the barrier properties of which are reduced by moisture from the filled product. Alternatively, the change in oxygen barrier condition could be triggered by another ingredient in the product, for example, carbon dioxide or volatile organic compounds. Encapsulating the central oxygen scavenger layer eliminates any potential food contact problems.

In an alternative three-layer construction, a central oxygen scavenging core layer is disposed between inner and outer layers, at least one of the inner and outer layers being permeable to and including a catalyst which enhances the oxygen scavenging activity of the core layer.

Another three-layer sidewall construction may comprise inner and outer layers of substantially virgin PET, and a core layer including PC-PET, an aliphatic polyketone, virgin PET, and PEN. Where the core layer includes a blend of PET and PEN, it may comprise 5–20% homopolymer PEN by total weight of the blend. Where the core layer includes a copolymer of PET and PEN, it may comprise a copolymer of ethylene with terephthalate and including 5–20% naphthalate by total weight of the copolymer. The PEN provides enhanced thermal resistance in higher temperature applications.

Figure 9:
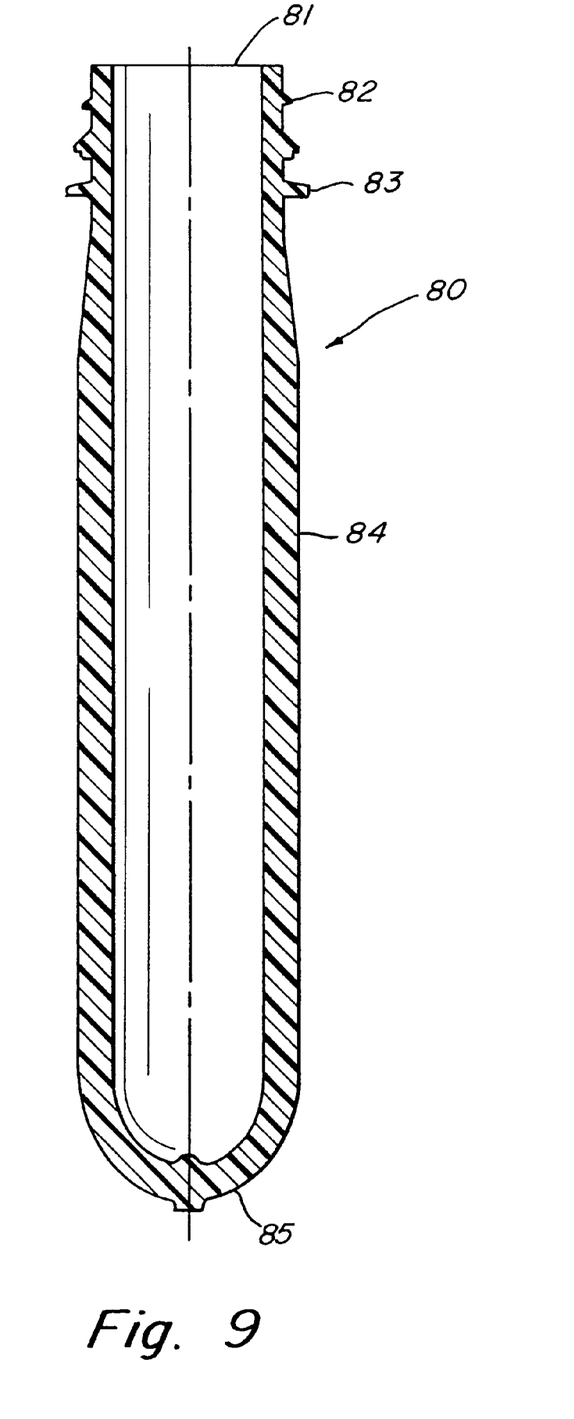
FIG. 9 is a cross-sectional view of a single layer preform according to another embodiment of the invention.

FIG. 9 shows a single layer preform 80 which can be used to make a single layer container according to another embodiment of the invention. The preform includes open top end 81, a neck finish with outer threads 82 and flange 83, sidewall forming portion 84 and base forming portion 85. The preform may be made from a blend of 98% virgin PET and 2% ethylene/propylene/carbon monoxide terpolymer for good clarity and ease of processability.

The base polymer in the oxygen scavenger blend may be an aromatic condensation polymer including formable polyesters, polyamides and polycarbonates. Suitable polyesters include polyethylene terephthalate (PET), polybutylene terephthalate (PBT), polypropylene terephthalate (PPT), polyethylene napthalate, and a cyclohexane dimethanol/PET copolymer, known as PETG (available from Eastern Chemical, Kingsport, Tenn.). Suitable polyamides (PA) include PA6, PA6,6, PA6,4, PA6,10, PA11, PA12, etc. Other options include acrylic/imide, amorphous nylon, polyacrylonitrile (PAN), polystyrene, crystallizable nylon (MXD-6), polyethylene (PE), polypropylene (PP), and polyvinyl chloride (PVC).

Polyesters based on terephthalic or isophthalic acid are commercially available and convenient. The hydroxy compounds are typically ethylene glycol and 1,4-di-(hydroxy methyl)-cyclohexane. The intrinsic viscosity for phthalate polyesters are typically in the range of 0.6 to 1.2, and more particularly 0.7 to 1.0 (for O-chlorolphenol solvent). 0.6 corresponds approximately to a viscosity average molecular weight of 59,000, and 1.2 to a viscosity average molecular weight of 112,000. In general, the phthalate polyester may include polymer linkages, side chains, and end groups not related to the formal precursors of a simple phthalate polyester previously specified. Conveniently, at least 90 mole percent will be terephthalic acid and at least 90 mole percent an aliphatic glycol or glycols, especially ethylene glycol.

Post-consumer PET (PC-PET) is prepared from PET plastic containers and other recyclables that are returned by consumers for a recycling operation, and has now been approved by the FDA for use in certain food containers. PC-PET is known to have a certain level of I.V. (intrinsic viscosity), moisture content, and contaminants. For example, typical PC-PET (having a flake size of one-half inch maximum), has an I.V. average of about 0.66 dl/g, a relative humidity of less than 0.25%, and the following levels of contaminants:

PVC:<100 ppm aluminum:<50 ppm olefin polymers (HDPE, LDPE, PP):<500 ppm paper and labels:<250 ppm colored PET:<2000 ppm other contaminants:<500 ppm Also useful as a base polymer or as a high-oxygen barrier layer is a packaging material with physical properties similar to PET, namely polyethylene naphthalate (PEN). PEN also provides a 3–5× improvement in barrier property and enhanced thermal resistance, at some additional expense.

Oxygen barrier layers other than EVOH and PEN may include polyvinyl alcohol (PVOH), polyvinyldene chloride (PVDC), nylon 6, crystallizable nylon (MXD-6), LCP (liquid crystal polymer), amorphous nylon, polyacrylonitrile (PAN) and styrene acrylonitrile (SAN).

A masterbatch preparation may be used, similar to that described in U.S. Ser. No. 08/349,173, filed Dec. 7, 1994 by Collette et al., and hereby incorporated by reference.

The container of the present invention may be used to provide good oxygen barrier properties for products such as carbonated soft drinks. It is particularly useful in packaging products such as beer, because beer rapidly loses its flavor due to oxygen migration into the bottle. This is also true for products such as citrus products, tomato-based products, and aseptically-packaged meat.

The intrinsic viscosity (I.V.) effects the processability of the resins. Polyethylene terephthalate having an intrinsic viscosity of about 0.8 is widely used in the carbonated soft drink (CSD) industry. Polyester resins for various applications may range from about 0.55 to about 1.04, and more particularly from about 0.65 to 0.85 dl/g. Intrinsic viscosity measurements of polyester resins are made according to the procedure of ASTM D-2857, by employing 0.0050±0.0002 g/ml of the polymer in a solvent comprising o-chlorophenol (melting point 0° C.), respectively, at 30° C. Intrinsic viscosity (I.V.) is given by the following formula:

$$I.V. = (ln(V_{Soln.}/V_{Sol.}))/C$$

where:

$V_{Soln.}$ is the viscosity of the solution in any units;

$V_{Sol.}$ is the viscosity of the solvent in the same units; and

C is the concentration in grams of polymer per 100 mls of solution.

The blown container should be substantially transparent. One measure of transparency is the percent haze for transmitted light through the wall ($H_T$) which is given by the following formula:

$$H_T = [Y_d \div (Y_d + Y_s)] \times 100$$

where $Y_d$ is the diffuse light transmitted by the specimen, and $Y_s$ is the specular light transmitted by the specimen. The diffuse and specular light transmission values are measured in accordance with ASTM Method D 1003, using any standard color difference meter such as model D25D3P manufactured by Hunterlab, Inc. The container of this invention should have a percent haze (through the panel wall) of less than about 10%, and more preferably less than about 5%.

The preform should also be substantially transparent, having a percent haze across the wall of no more than about 10%, and more preferably no more than about 5%.

The container will have varying levels of strain-induced crystallinity in the layers at various positions along the height of the bottle from the neck finish to the base, based on the varying stretch ratios along the bottle. The percent crystallinity may be determined according to ASTM 1505 as follows:

$$\% \text{ crystallinity} = [(ds-da)/(dc-da)] \times 100$$

where ds=sample density in g/cm³, da=density of an amorphous film of zero percent crystallinity, and dc=density of the crystal calculated from unit cell parameters. The panel portion of the container is stretched the greatest and preferably has an average percent crystallinity in the outer layer of at least about 15%, and more preferably at least about 20%. For primarily PET polymers, a 15–25% crystallinity range is useful in refill and hot-fill applications.

Further increases in crystallinity can be achieved by heat setting to provide a combination of strain-induced and thermal-induced crystallization. Thermal-induced crystallinity is achieved at low temperatures to preserve transparency, e.g., holding the container in contact with a low temperature blow mold. In some applications, a high level of crystallinity at the surface of the sidewall alone is sufficient.

As used herein, "package" includes packaging structures other than blow-molded containers, such as packaging films.

While there have been shown and described several embodiments of the present invention, it will be obvious to those skilled in the art that various changes and modifications may be made therein without departing from the scope of the invention as defined by the appending claims.

What is claimed is:

1. A substantially transparent package including a blend of an aliphatic polyketone as an oxygen scavenger having the formula:

wherein n is the number of repeating units and R is selected from the group consisting of hydrogen, an organic side chain, and a silicon-based side chain, the blend further including a biaxially orientable polymer wherein the biaxially orientable polymer comprises 90 to 99.9% by total weight of the blend and the polyketone 0.1 to 10% by total weight of the blend.

2. The package of claim 1, wherein the biaxially orientable polymer is polyester.

3. The package of claim 2, wherein the biaxially orientable polymer is substantially polyethylene terephthalate (PET).

4. The package of claim 2, wherein the polyester has an intrinsic viscosity in 0-chlorophenol on the order of 0.8 to 1.2.

5. The package of claim 1, wherein the package comprises a single layer.

6. The package of claim 1, wherein the aliphatic polyketone is a copolymer of ethylene and carbon monoxide having the formula:

7. The package of claim 1, wherein the aliphatic polyketone is a terpolymer having the formula:

wherein m is the number of repeating units and X is selected from the group consisting of an organic side chain and a silicon side chain.

8. The package of claim 7, wherein the aliphatic polyketone is a terpolymer of ethylene, carbon monoxide, and an olefin compound selected from the group consisting of propylene, 1-butene, 1-pentene, 1-octene, halogen-substituted olefins, silane-substituted olefins, acrylates, methacrylates, alkyl compounds, vinyl acrylate, vinylsilanes, and vinyl chloride.

9. The package of claim 7, wherein the aliphatic polyketone is a terpolymer of ethylene, propolyene and carbon monoxide having the formula:

10. The package of claim 2, wherein the aliphatic polyketone is a terpolymer of ethylene, styrene and carbon monoxide having the formula:

11. The package of claim 7, wherein the aliphatic polyketone is a terpolymer of ethylene, a silane-substituted olefin, and carbon monoxide having the formula:

where R is a hydrocarbon.

12. The package of claim 1, wherein the package includes a core layer of the aliphatic polyketone and inner and outer layers of a polyester.

13. The package of claim 12, wherein the inner and outer layers comprise substantially polyethylene terephthalate (PET).

14. The package of claim 13, wherein the outer layer includes a high-oxygen barrier material selected from the group consisting of ethylene vinyl alcohol (EVOH), polyvinyl alcohol (PVOH), polyvinyldene chloride (PVDC), polyethylene naphthalate (PEN), polyacrylonitrile (PAN), styrene acrylonitrile (SAN), liquid crystal polymer (LCP), MXD-6 nylon, and polybutylene terephthalate (PBT).

15. The package of claim 12, wherein the core layer includes post-consumer polyethylene terephthalate (PC-PET).

16. The package of claim 15, wherein the PC-PET comprises at least on the order of 10% of the total weight of the core layer.

17. The package of claim 15, wherein the PC-PET has an intrinsic viscosity on the order of 0.58 to 0.77 dl/g and a moisture content on the order of 50–300 ppm.

18. The package of claim 1, wherein the blend includes a catalyst which enhances the oxygen scavenging activity of the aliphatic polyketone.

19. The package of claim 18, wherein the catalyst is selected from the group consisting of cobalt, antimony, germanium, gold, and palladium.

20. The package of claim 1, wherein the biaxially oriented polymer is selected from the group consisting of polyesters, polycarbonates, polyolefins, polyarylates, polymethacrylates, polyacrylates, polyalkyl compounds, polyvinylacrylates, polyvinylsilanes, polyvinyl chloride, and polycyclics.

21. The package of claim 20, wherein the polyester is selected from the group consisting of PET, PETG, PEN, PBT, PPT, recycled polyester, and blends or copolymers of the same.

22. The package of claim 21, wherein the polyester includes on the order of 0.1 to 2% aliphatic polyketone and aldol condensation products thereof as a percentage of the total weight of the blend.

23. The package of claim 22, wherein the aldol reaction product comprises on the order of 0 to 2% by total weight of the blend.

24. The package of claim 1, wherein the blend further includes an aldol condensation product of the aliphatic polyketone having the formula:

$(C_3H_4O)_m(C_3H_2)_n$ where m and n are the numbers of repeating units.

25. The package of claim 1, wherein the aliphatic polyketone has an intrinsic viscosity in m-cresol on the order of 0.5 to 1.5.

26. A preform for making a substantially transparent, biaxially-oriented container body, the preform including one or more layers of a blend of an aliphatic polyketone as an oxygen scavenger having the formula:

where n is the number of repeating units and R is selected from the group consisting of hydrogen, an organic side chain, and a silicon-based side chain, the blend further including a biaxially orientable polymer wherein the biaxially orientable polymer comprises 90 to 99.9% by total weight of the blend and the polyketone 0.1 to 10% by total weight of the blend.

* * * * *